(12) United States Patent
Dunmire et al.

(10) Patent No.: US 9,036,793 B2
(45) Date of Patent: *May 19, 2015

(54) CALLER AUTHENTICATION SYSTEM

(71) Applicant: AT&T Intellectual Property I, L.P., Atlanta, GA (US)

(72) Inventors: David L. Dunmire, Roswell, GA (US); Jeff P. Clark, Edmond, OK (US); Brian M. Novack, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,855

(22) Filed: Jul. 21, 2014

(65) Prior Publication Data

US 2014/0328473 A1 Nov. 6, 2014

Related U.S. Application Data

(63) Continuation of application No. 12/022,855, filed on Jan. 30, 2008, now Pat. No. 8,787,535.

(51) Int. Cl.
*H04M 1/64* (2006.01)
*H04M 3/42* (2006.01)
*G10L 17/02* (2013.01)
*H04L 29/06* (2006.01)

(52) U.S. Cl.
CPC .......... *H04M 3/42059* (2013.01); *G10L 17/02* (2013.01); *H04L 63/0861* (2013.01); *H04M 2201/41* (2013.01); *H04M 2201/405* (2013.01); *H04M 2203/60* (2013.01)

(58) Field of Classification Search
USPC .................... 379/88.01, 88.02, 88.03, 265.04
See application file for complete search history.

(56) References Cited

U.S. PATENT DOCUMENTS

| | | |
|---|---|---|
| 5,465,290 A | 11/1995 | Hampton et al. |
| 5,502,759 A | 3/1996 | Cheng et al. |
| 6,539,101 B1 | 3/2003 | Black |
| 6,801,890 B1 | 10/2004 | Kauschke et al. |
| 7,107,220 B2 | 9/2006 | Novack et al. |
| 7,215,755 B2 | 5/2007 | Novack |
| 7,254,383 B2 | 8/2007 | Novack et al. |
| 7,317,792 B2 | 1/2008 | Novack |
| 7,324,946 B2 | 1/2008 | Novack et al. |
| 7,412,036 B1 | 8/2008 | Charpentier et al. |
| 7,526,080 B2 | 4/2009 | Novack |

(Continued)

*Primary Examiner* — Amal Zenati
(74) *Attorney, Agent, or Firm* — Jackson & Walker L.L.P.

(57) ABSTRACT

A disclosed method of authenticating a telephone caller includes receiving an authentication request for the telephone caller that includes a voice recording of the caller and household information indicative of a household, creating a first voice pattern based on the voice recording of the caller, retrieving a second voice pattern using at least some of the household information, comparing the two voice patterns, and transmitting information indicative of the results of the comparison. The transmitted information may include information that the telephone caller is authenticated, is not authenticated, or that the comparison results were inconclusive. The method may include monitoring telephone calls with the household, and if it is determined that a voice on at least some of the telephone calls is associated with the household, creating the second voice pattern based on the voice, and associating the second voice pattern to the household. The method may further include disassociating the second voice pattern from the household if it is determined that a change of household has occurred.

20 Claims, 7 Drawing Sheets

(56) References Cited

U.S. PATENT DOCUMENTS

| | | |
|---|---|---|
| 7,792,270 B2 | 9/2010 | Novack |
| 2002/0169608 A1* | 11/2002 | Tamir et al. ................... 704/246 |
| 2004/0064480 A1* | 4/2004 | Bartlett et al. ............. 707/104.1 |
| 2004/0190688 A1* | 9/2004 | Timmins et al. ........... 379/88.02 |
| 2008/0015859 A1 | 1/2008 | Novack et al. |
| 2008/0071545 A1 | 3/2008 | Novack et al. |
| 2008/0112556 A1 | 5/2008 | Modarressi et al. |
| 2010/0322405 A1 | 12/2010 | Novack |

* cited by examiner

CALLER AUTHENTICATION SYSTEM

The present patent application is a continuation of a previously filed patent application, U.S. patent application Ser. No. 12/022,855, filed Jan. 30, 2008, the entirety of which is hereby incorporated by reference. Pursuant to 37 CFR §1.78 (a)(3), an application data sheet containing a reference to the previously filed application, unless submitted previously, is submitted contemporaneously herewith.

BACKGROUND

1. Field of the Disclosure

The present disclosure relates to confirming the identity of telephone callers.

2. Description of the Related Art

Individuals often use a telephone to access personal or restricted information that is maintained by third parties such as financial institutions, stock brokers, credit card issuers, department stores, service providers, and the like. Before being permitted to access such information, such individuals are typically required to confirm their identity using a password, personal identification number, or combination of the two.

DESCRIPTION OF THE EMBODIMENT(S)

Figure 1:
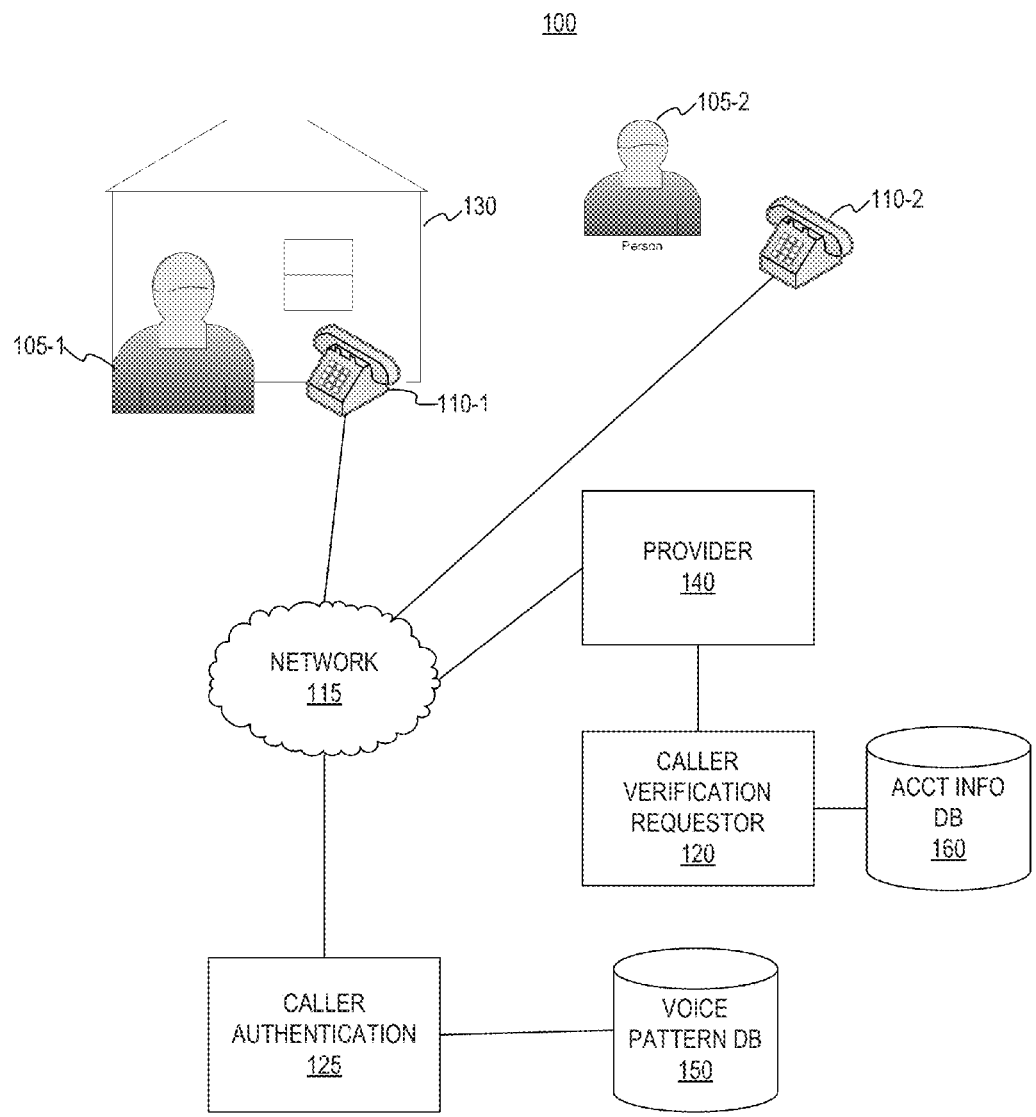
FIG. 1 is a block diagram of selected elements of a telephone caller authentication system.

In one aspect, a disclosed method of authenticating a telephone caller includes receiving an authentication request for the telephone caller that includes a voice recording of the caller and household information indicative of a household, creating a first voice pattern based on the voice recording of the caller, retrieving a second voice pattern using at least some of the household information, comparing the two voice patterns, and transmitting information indicative of the results of the comparison. The method may further include monitoring telephone calls with the household, if it is determined that a voice on at least some of the telephone calls is associated with the household, creating the second voice pattern based on the voice, and associating the second voice pattern to the household. In another embodiment, the method includes disassociating the second voice pattern from the household if a household change has occurred for the household.

In another aspect, a caller authentication device suitable for authenticating telephone callers is disclosed. The device includes storage, a processor operable to access the storage, a caller authentication request interface for receiving an authentication request for a caller wherein an authentication request includes a voice recording of the caller and further includes household information indicative of a household, a telephone call monitoring interface for monitoring calls with the household, and one or more applications modules, at least partially stored in the storage, including instructions executable by the processor. The one or more application modules include instructions to: create a first voice pattern based on the voice recording of the caller; retrieve a second voice pattern using at least some of the household information; compare the first voice pattern to the second voice pattern; and transmit information indicative of a result of the comparison. The one or more application modules may further include instructions to: monitor a plurality of telephone calls with the household; create the second voice pattern based on a voice when the voice is determined to be associated with the household; and assign the second voice pattern to at least one of a physical address for the household and a telephone number for the household.

In a further aspect, a computer program stored on a tangible computer readable medium is disclosed. The computer program has instructions operable for authenticating a telephone caller alleging to be associated with a household. The computer program further has instructions for monitoring a plurality of telephone calls with the household and instructions for creating a first voice pattern in response to determining that a voice on at least some of the plurality of telephone calls is associated with the household. Further instructions are operable for associating the first voice pattern with the household, creating a second voice pattern based on the voice recording of the telephone caller, retrieving the first voice pattern using information indicative of the household, and comparing the first voice pattern to the second voice pattern. Instructions are further included for delivering the results of the comparison and for disassociating and/or de-assigning the first voice pattern from the household upon determining that a household change has occurred for the household.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

Referring now to the drawings, FIG. 1 depicts selected elements of an embodiment of a telephone caller authentication (TCA) system 100. In the depicted embodiment, TCA system 100 includes customer premises equipment (CPE) 110, a caller authenticator resource (CAR) 125, and a provider 140 all connected via a network 115. In the depicted embodiment, provider 140 is communicatively coupled to a caller verification requestor resource (CVRR) 120. CAR 125 as shown in FIG. 1 has access to a voice pattern database 150.

Voice pattern database 150 may contain one or more voice patterns wherein at least one of the voice patterns is associated with household information indicative of a particular household (such as the physical address of the household or a telephone number associated with the household). In this way, voice pattern database 150 may, if queried for voice patterns associated with particular household information, return at least one voice pattern associated with the particular household information. In some embodiments, network 115 may include elements of a public network such as the public telephone switch network or the Internet, a private network including Internet Protocol based private networks, or both. CPE 110 may be located in a household 130 (as depicted by CPE 110-1) and, as depicted in FIG. 1, CPE 110 may be a telephone. Also as depicted, CPE 110 may not be located in household 130 (as depicted by CPE 110-2). Household 130 includes a telephone caller 105-1 who may reside in household 130 and who may use CPE 110-1 to place telephone calls from household 130 or to receive telephone calls made to household 130.

In some embodiments, TCA system 100 facilitates the ability of provider 140 to authenticate the identity of telephone callers 105 who call provider 140 to access information that may be personal or restricted. Such authentication may be performed in the depicted embodiment of TCA system 100 without the need for telephone callers 105 to provide a password, personal identification number, or some combination of the two. Provider 140 may be any person or entity that maintains information such as account or personal information for which access should be restricted to authorized individuals. Examples of provider 140 include financial institutions, stock brokers, credit card issuers, department stores, service providers, and the like. Before permitting telephone callers 105 to access such personal or restricted information, provider 140 may invoke CVRR 120 of TCA system 100 in an effort to determine if telephone caller 105 is authorized to access the requested information.

In some embodiments, CVRR 120 obtains a recording of telephone caller's 105 voice and account information associated with the restricted information telephone caller 105 desires to access. CVRR 120, as shown in FIG. 1, has access to an account information database 160. Account information database 160 may contain one or more account numbers wherein at least one of the account numbers is associated with a particular household by way of household information indicative of the household (such as the physical address of the household, a telephone number associated with the household, or other information indicative of the household). In this way, using account information submitted by telephone callers 105 (such as an account number associated with the information), CVRR 120 may query account information database 160 to obtain a physical address, a telephone number, or other information indicative of a household associated with the account number. In alternative embodiments, provider 140 may provide CVRR 120 with a recording of telephone caller's 105 voice and may further provide CVRR 120 with information indicative of a household associated with information which telephone caller 105 is attempting to access. In other embodiments, provider 140 may provide CAR 125 with a recording of telephone caller's 105 voice and may further provide CAR 125 with information indicative of a household associated with information which telephone caller 105 is attempting to access. Provider 140, CVRR 120, and CAR 125 may use interactive voice response technology to provide or obtain any or all of the voice recording of telephone callers 105, the account number for the information telephone callers 105 desire to access, or the household information indicative of a household associated with the information telephone callers 105 desire to access.

CVRR 120 may, through network 115, communicate an authentication inquiry to CAR 125. In alternative embodiments, provider 140 may communicate an authentication inquiry to CAR 125. The authentication inquiry may include a recording of telephone caller's 105 voice together with information indicative of a household associated with the information which telephone caller 105 desires to access. In other embodiments, a voice pattern is created by CVRR 120 or provider 140 based on the recording of telephone caller's 105 voice and such voice pattern in included within the authentication inquiry. Such household information may include an address or telephone number for the household or any other information indicative of the particular household such as a plat number, property identification number, legal property description, or the like. Upon receipt of an authentication inquiry, CAR 125 as shown in FIG. 1 accesses voice pattern database 150 or may access another storage resource available to CAR 125 (not depicted) to determine if telephone caller 105 is authenticated to access the desired information. In one embodiment, CAR 125, after receiving the voice recording and the household information, creates a first voice pattern based on the voice recording and accesses voice pattern database 150 to obtain a second voice pattern associated with the household information. CAR 125 then compares the first voice pattern to the second voice pattern to determine if the voice patterns match. In alternative embodiments, the first voice pattern based on the voice recording of telephone caller 105 may be provided to CAR 125. Creation (if applicable) and comparison of the voice patterns may be performed by CAR 125 using commercially available voice authentication systems. One example of such a system is Nuance Verifier 3.5, the trademarked voice authentication software of Nuance Communications, Inc. with offices located in Burlington, Mass.

Based on the comparison result, CAR 125 communicates the results of the comparison to CVRR 120. In other embodiments, CAR 125 may communicate the results of the comparison directly to provider 140 or to telephone caller 105 or to such other party or device (or combination of the foregoing) as CAR 125 may be directed to do. Based on the results of the comparison, provider 140 may then elect to permit telephone caller 105 to access the desired information, may then prevent telephone caller 105 from accessing the desired information, or may then perform further authentication of telephone caller 105 such as requesting additional information from telephone caller 105 (such as a password, personal identification number, account history, etc.) that is unique to the account associated with the information telephone caller 105 desires to access. In further embodiments, CAR 125 may be communicatively coupled to provider 140 and/or CVRR 120 and (as applicable) account information database 160 so as to permit CAR 125 to receive, process, and respond to an authentication request in real time (i.e., such that provider 140 and/or telephone caller 105 experience no or minimal delay in receiving the results of the comparison).

Thus, the described TCA system 100 is operable to authenticate a telephone caller as residing within a household associated with restricted information that the telephone caller desires to access. TCA system 100 is operable to perform the authentication process automatically and without the requirement for the telephone caller to provide a password, personal identification number, or some combination of the two. Although TCA system 100 is described herein with respect to telephone calls with consumer oriented service providers, one skilled in the field will recognize the applicability of the described system for use in non-consumer applications and environments. As an example, TCA system 100 may be employed in industrial, business to business, governmental, educational, and other environments to authenticate the identity of callers desiring to access information maintained by entities or persons operating in such environments.

Figure 2:
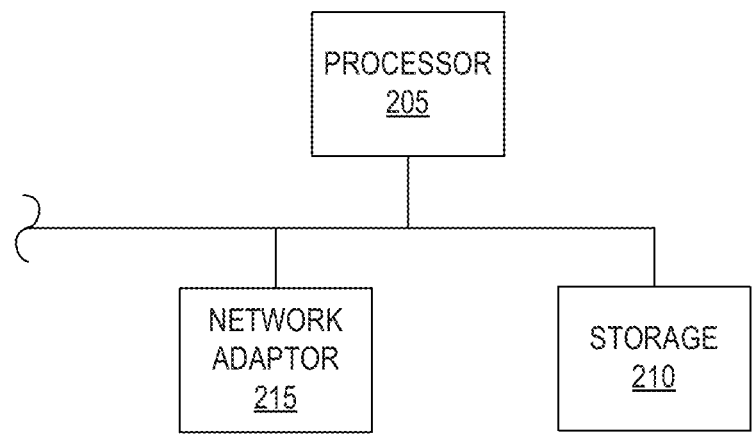
FIG. 2 is a block diagram of selected elements of a caller authentication resource suitable for use in the system of FIG. 1.

Referring now to FIG. 2, a simplified block diagram illustrates selected elements of an embodiment of CAR 125. In some embodiments, CAR 125 represents, or resides on, a server that is accessible to CVRR 120 and/or provider 140. In the illustrated embodiment, CAR 125 includes a processor 205 having access to a storage resource 210. Processor 205 may be implemented with a general purpose microprocessor such as in a desktop or notebook personal computer, an embedded processor such as in a network aware device, or another suitable processor device such as a server class microprocessor device such as a Xeon® processor from Intel or an Opteron® processor from Advanced Micro Devices. A network adapter or interface 215 is operable to connect CAR 125 to an external network including the network 115 depicted in FIG. 1.

The storage resource 210 of CAR 125 may include volatile storage including, as examples, dynamic random access memory and static dynamic random access memory, as well as non-volatile storage including, as examples, magnetic disks, optical disks, floppy disks, magnetic tapes, Read Only Memory devices, flash memory devices, and the like. In some embodiments, portions or features of CAR 125 may be implemented as computer software modules that include a set or sequence of computer executable instructions stored on storage resource 210 or another suitable storage device accessible to processor 205.

Figure 4:
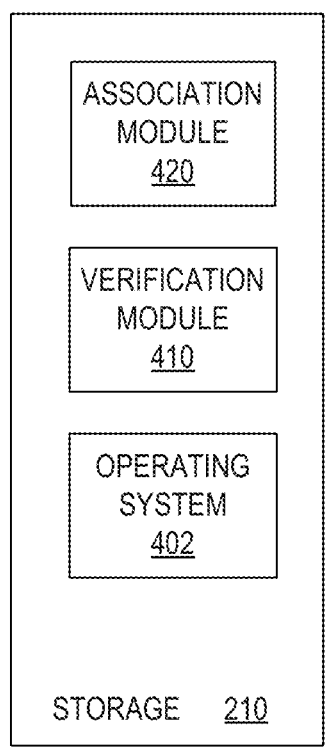
FIG. 4 is a block diagram of selected software modules employed in one embodiment of the caller authentication resource of FIG. 2.

Referring to FIG. 4, for example, a block diagram of selected software modules embedded or otherwise stored in storage resource 210 of one embodiment of CAR 125 is presented. In the depicted embodiment, an operating system 402 supports a verification module 410 and an association module 420. Operating system 402 may include elements of commercially distributed operating systems including a Windows® family operating system from Microsoft, a Linux® family operating system, a Unix family operating system, and or the like. Verification module 410 and association module 420 operate, as described in greater detail below with respect to the operations depicted in FIG. 6, FIG. 7A, and FIG. 7B to verify whether a submitted voice recording or voice pattern matches a voice pattern associated with a specified household.

Figure 3:
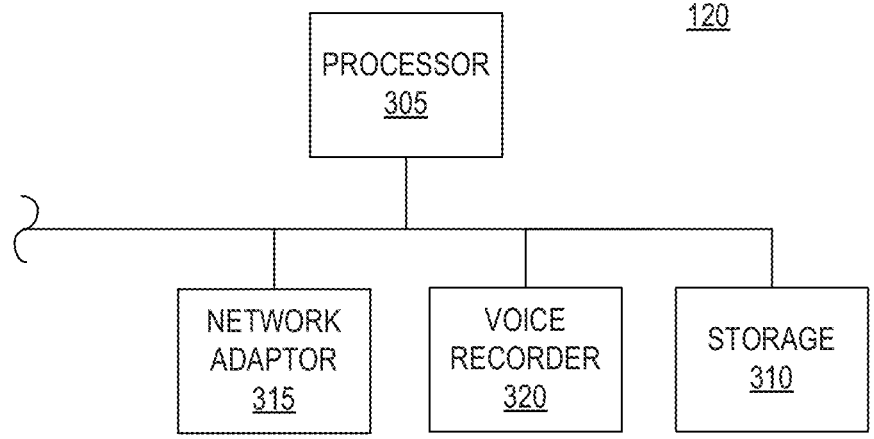
FIG. 3 is a block diagram of selected elements of a caller verification requestor resource suitable for use in the system of FIG. 1.

Referring to FIG. 3, selected elements of one embodiment of CVRR 120 are illustrated. In some embodiments, CVRR 120 represents, or resides on, a server that is accessible to provider 140 and/or CAR 125. As depicted in FIG. 3, a storage resource 310, a network adapter 315, and a voice recorder 320 are accessible to a processor 305. Like processor 205, processor 305 may be implemented with a general purpose microprocessor such as in a desktop or notebook personal computer, an embedded processor such as in a network aware device, or another suitable processor device such as a server class microprocessor device such as a Xeon® processor from Intel or an Opteron® processor from Advanced Micro Devices. Storage resource 310 of CVRR 120 may (like the storage resource 210 of CAR 125) include volatile storage including, as examples, dynamic random access memory and static dynamic random access memory, as well as non-volatile storage including, as examples, magnetic disks, optical disks, floppy disks, magnetic tapes, Read Only Memory devices, flash memory devices, and the like. Network adapter or interface 315 provides an interface that enables communication between processor 305 and network 115. In some embodiments, portions or features of CVRR 120 may be implemented as computer software modules that include a set or sequence of computer executable instructions stored on storage resource 310 or another suitable storage device accessible to processor 305.

Figure 5:
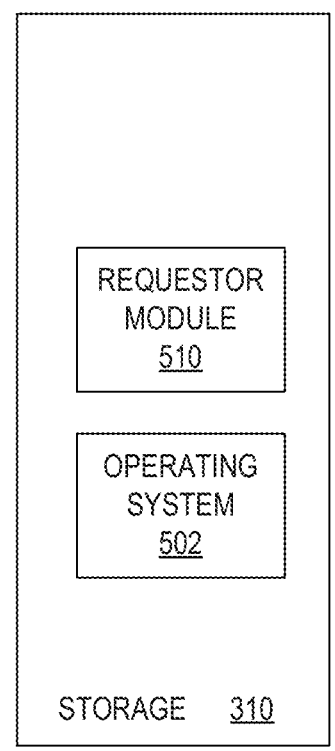
FIG. 5 is a block diagram of selected software modules employed in one embodiment of the caller verification requestor resource of FIG. 3.

Referring to FIG. 5, the depicted embodiment of storage resource 310 is shown as including an operating system 502 and a requestor module 510. Operating system 502 may include elements of commercially distributed operating systems including a Windows® family operating system from Microsoft, a Linux® family operating system, a Unix family operating system, and or the like. Requestor module 510, as described in greater detail below with respect to the operations depicted in FIG. 8, initiates verification requests by identifying a telephone call from telephone caller 105, obtaining a voice recording of telephone caller 105, obtaining applicable household information from account information database 160, and transmitting the obtained voice recording of telephone caller 105 and the applicable household information from account information database 160 to CAR 125. In alternative embodiments, provider 140 may obtain a voice recording of telephone caller 105, may obtain applicable household information associated with the information which telephone caller desires to access, and may transmit the obtained voice recording and household information to CAR 125 or to CVRR 120. In some embodiments, provider 140 and/or CVRR 120 may create a first voice pattern based on the voice recording and transmit the first voice pattern alone to CAR 125.

Figure 6:
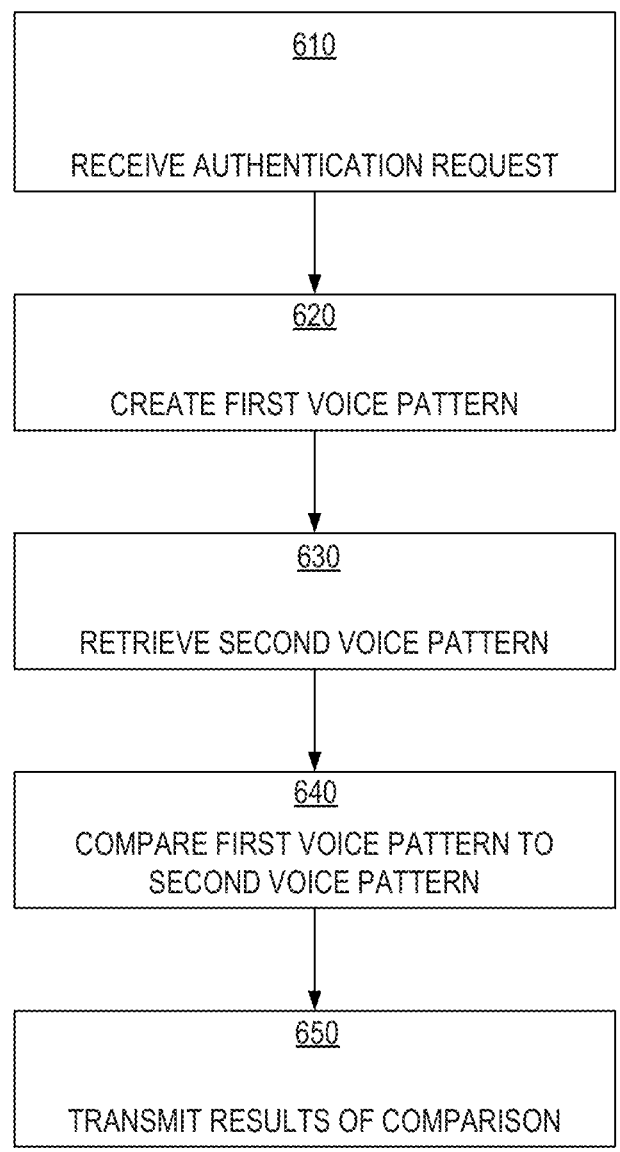
FIG. 6 is a flow diagram of selected elements of an embodiment of a telephone caller authentication method performed by the caller authentication resource of FIG. 2.

Referring now to FIG. 6, a flow diagram illustrates selected elements of one embodiment of a method 600 of authenticating a telephone caller. Verification module 410 of CAR 125 of TCA system 100 may be used to perform methodology 600. Further, methodology 600 may be performed by a computer program stored on computer readable medium with instructions operable to cause one or more data processing systems to carry out the operations shown in methodology 600. As used herein, the term computer readable medium should be taken to include a single medium or multiple media (e.g., a centralized or distributed database, and/or associated caches and servers) that store the one or more instructions. As shown, operation 610 relates to receiving an authentication request. In some embodiments, the authentication request may be generated by CVRR 120 of TCA system 100 illustrated in FIG. 1. In other embodiments, the authentication request may be generated by provider 140. The authentication request may include a voice recording of the telephone caller and household information indicative of a household associated with information which the telephone caller desires to access. In other embodiments, the authentication request may also include a first voice pattern based on the voice recording. In further embodiments, a first voice pattern based on the voice recording may be provided in lieu of the voice recording. As shown, a first voice pattern or print based on the provided voice recording is created (operation 620). In embodiments where a first voice pattern is provided to CAR 125, method 600 may omit operation 620 and proceed directly to operation 630. Operation 630 relates to retrieving a second voice pattern or print utilizing the provided household information. The first voice pattern is then compared to the second voice pattern in operation 640 and the results of the comparison are transmitted (operation 650). In some embodiments, the results of the comparison are transmitted to CVRR 120. In other embodiments, the results of the comparison are transmitted to provider 140 or to telephone caller 105 or to such other party or device (or combination of the foregoing) as CAR 125 may be directed to do.

In one embodiment, method 600 of FIG. 6 is described in more detail with respect to TCA system 100 depicted in FIG. 1. In this embodiment, telephone caller 105-1 may place a telephone call to provider 140. The telephone call may be placed using CPE 110-1 or may be placed using something other than CPE 110-1 such as CPE 110-2 (which as depicted is a telephone not located within household 130). Upon receiving the telephone call from telephone caller 105-1, provider 140 obtains information indicative of an account associated with information which telephone caller 105-1 desires to access. As noted above, such information may be obtained by way of interactive voice response technology. Provider 140 then initiates CVRR 120. In some embodiments, initiation of CVRR 120 may be automatically implemented upon receipt of the telephone call by provider 140 or may be selectively implemented after receipt of the telephone call using interactive voice response technology or other suitable means such as initiation by an individual or operator who has received the telephone call. Using the account information, CVRR 120 accesses account information database 160 and obtains household information indicative of the account for which telephone caller 105-1 desires to access information. In operation 610, CAR 125 receives an authentication request from CVRR 120 to authenticate telephone caller 105-1. In other embodiments, the authentication request may be received from provider 140. The authentication request includes a voice recording of telephone caller 105-1 and household information which is indicative of a particular household (in this instance household 130) associated with the information which telephone caller 105-1 desires to access. The voice recording may be created by CVRR 120 and the household information may be retrieved by CVRR 120 from account information database 160. In operation 620, CAR 125 creates a first voice pattern based on the transmitted voice recording of telephone caller 105-1. In operation 630, CAR 125 retrieves at least one second voice pattern from voice pattern database 150 using the household information. CAR 125 then compares the first voice pattern to the at least one second voice pattern to determine if telephone caller 105-1 is associated with household 130. If more than one second voice pattern is associated with household 130 in voice pattern database 150, CAR 125 may compare the first voice pattern to the associated second voice patterns until either a match is found or until all or substantially all of the associated second voice patterns have been compared. If the first voice pattern matches a retrieved second voice pattern, CAR 125 transmits information that telephone caller 105-1 is authenticated. In an instance where telephone caller 105-2, who is not associated with household 130, places a telephone call using CPE 110-2 or other CPE (not depicted) to provider 140 and desires to obtain access to information associated with household 130, the first voice pattern created by CAR 125 of telephone caller 105-2 would not match (operation 640) any of the associated second voice prints retrieved in operation 630, and CAR 125 would transmit (operation 650) information that telephone caller 105-2 is not authenticated. In instances where the results of the comparison of the first voice pattern to a second voice pattern are not conclusive, CAR 125 transmits information that the comparison was inconclusive. Operations 620 and 640 may be performed by CAR 125 using commercially available voice authentication systems. One example of such a system is Nuance Verifier 3.5, the trademarked voice authentication software of Nuance Communications, Inc. with offices located in Burlington, Mass.

Figure 7A:
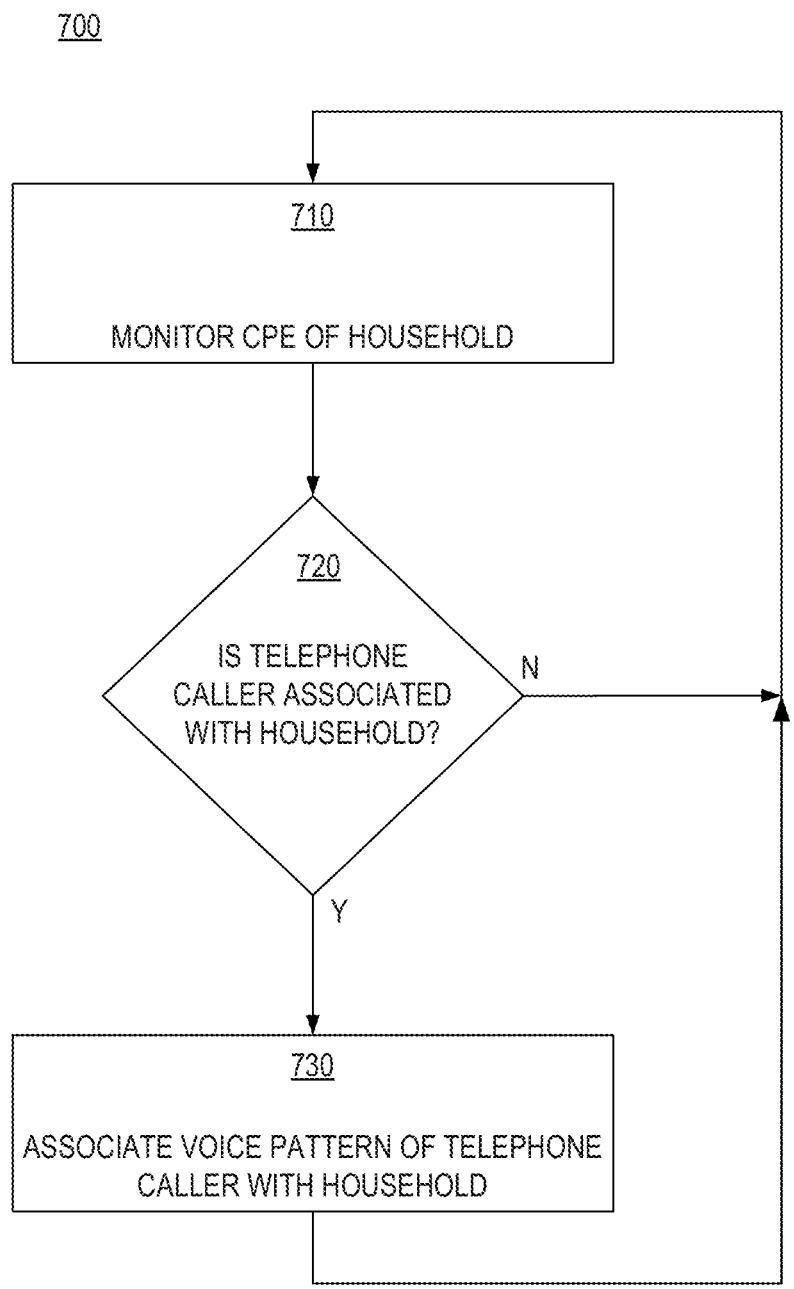
FIG. 7A is a flow diagram of selected elements of an embodiment of a telephone caller association method performed by the caller authentication resource of FIG. 2.

Referring now to FIG. 7A, a flow diagram illustrates selected elements of one embodiment of a method 700 of associating telephone callers with a particular household. Association module 420 of CAR 125 of TCA system 100 may be used to perform methodology 700. Further, methodology 700 may be performed by a computer program stored on computer readable medium with instructions operable to cause one or more data processing systems to carry out the operations shown in methodology 700. As shown, operation 700 relates to monitoring CPE associated with a household and associating telephone callers utilizing the monitored CPE with the household. As shown, operation 710 relates to monitoring CPE of a particular household. Such monitoring may include making voice patterns of telephone callers on telephone calls placed from or to the monitored CPE over a selected period of time. The voice patterns may be periodically reviewed and compared to determine in operation 720 if a sufficient number of voice patterns exists for a telephone caller so that such a telephone caller may in operation 730 be associated with (i.e., determined to be residing in) the particular household. The periodic review may be conducted over a period of days (fifteen or more for example) to avoid associating an individual who may be visiting the particular household. If a determination is made in operation 720 that a sufficient number of voice patterns exists for a telephone caller so that such a telephone caller may be associated with the particular household, then in operation 730 the voice pattern is associated with the household. In one embodiment, operation 730 involves updating voice pattern database 150 to include the association or assignment of the particular voice pattern to the particular household using applicable household information. In this way, more than one voice pattern may, in operation 730, be associated with or assigned to a particular household.

Figure 7B:
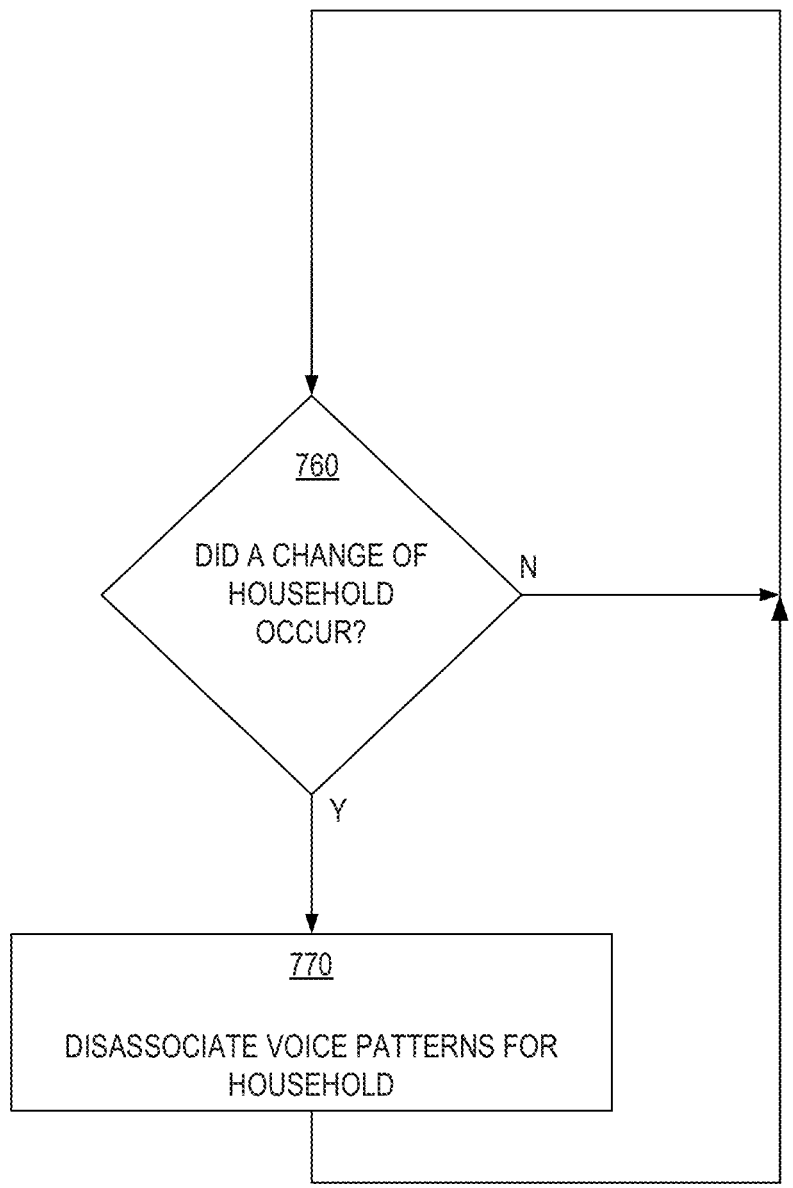
FIG. 7B is a flow diagram of selected elements of an embodiment of a telephone caller disassociation method performed by the caller authentication resource of FIG. 2.

Referring now to FIG. 7B, a flow diagram illustrates selected elements of one embodiment of a method 750 of disassociating telephone callers with a particular household. Association module 420 of CAR 125 of TCA system 100 may be used to perform methodology 750. Further, methodology 750 may be performed by a computer program stored on computer readable medium with instructions operable to cause one or more data processing systems to carry out the operations shown in methodology 750. As shown, operation 750 relates to disassociating or de-assigning voice patterns that are associated with or assigned to a particular household upon the occurrence of a change of household (i.e., the applicable home is sold, a new telephone number is acquired for the household, the existing telephone number or telephone account for the household is cancelled). Information on whether a change of household has occurred may be obtained from telephone company installation and de-installation records as well as real estate sales records. As shown, when a change of household is determined to occur (operation 760), voice patterns previously associated with, or assigned to, the applicable household are disassociated or de-assigned from the applicable household (operation 770). In this way, voice patterns previously associated with, or assigned to, a particular household may, in operation 770, be disassociated with or de-assigned from a particular household such that an individual previously associated with a particular household would no longer be authenticated following an authentication request when such individual is calling provider 140 to access information associated with the particular household (i.e., CAR 125 would transmit (operation 650) information that such individual is not authenticated).

Figure 8:
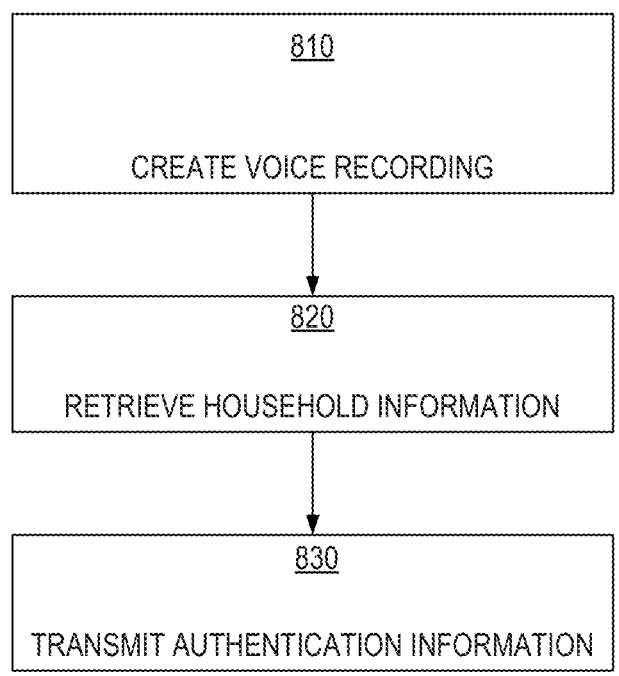
FIG. 8 is a flow diagram of selected elements of an embodiment of a method performed by the caller verification requestor resource of FIG. 3.

Referring now to FIG. 8, a flow diagram illustrates selected elements of one embodiment of a method 800 of transmitting a telephone caller verification request. Requestor module 510 of CVRR 120 of TCA system 100 may be used to perform methodology 800. Further, methodology 800 may be performed by a computer program stored on computer readable medium with instructions operable to cause one or more data processing systems to carry out the operations shown in methodology 800. As shown, operation 800 relates to creating a voice recording of a telephone caller, retrieving household information associated with information the telephone caller desires to access, and transmitting an authentication request. As shown, operation 810 relates to the creation of a voice recording for the telephone caller. Using account information associated with the account for which the telephone caller desires to access information, operation 820 relates to retrieving household information associated with the account. In one embodiment, operation 820 may be conducted by requestor module 510 by querying account information database 160. The voice recording of the telephone caller and the retrieved household information are then transmitted as an authentication request to CAR 125 (operation 830). In other embodiments, provider 140 may perform the operations of method 800.

The applicable household information contained in account information database 160 may be obtained by provider's 140 interaction with its customers. Provider 140 may desire to obtain additional household information beyond what may be available or readily obtained by way of provider's 140 interaction with its customers and to do so in a manner which does not require such additional household information to be obtained directly from the applicable customer. In one embodiment, CAR 125 may have access to additional household information obtained directly from households (as well as from third parties) such as ages of persons residing within the applicable household, employment information, income information, service preferences, gender, race, and the like. Such additional household information may be stored in voice pattern database 150 (or another database or storage device not depicted) and associated with the particular household. In such embodiment, CAR 125 may make available to provider 140 some or all of such additional household information data when CAR 125 transmits information that a telephone caller 105-1 for the applicable household is authenticated. In this way, provider 140 may obtain as part of the disclosed method of authenticating a telephone caller, additional household information regarding the household for which the telephone caller has been authenticated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An authentication method, comprising:
    monitoring a plurality of telephone calls associated with customer premises equipment of a household for a predetermined duration;
    for each of the plurality of telephone calls:
        responsive to determining that a voice pattern of a call participant matches a previously recorded pattern, determining whether a number of occurrences of the previously recorded pattern exceeds a sufficiency threshold; and
        responsive to determining the number of occurrences exceeds the sufficiency threshold, associating the voice pattern with the household;
    receiving, from an authentication requestor, a request to authenticate a telephone caller, the request including:
        a first voice pattern of the telephone caller; and
        household information indicative of the household;
    retrieving, based on at least some of the household information, a second voice pattern associated with a household member;
    comparing the first voice pattern to the second voice pattern;
    transmitting information indicative of a result of the comparing; and
    disassociating voice patterns associated with the household upon the occurrence of a change of household.

2. The method of claim 1, wherein the household information includes a street address of the household.

3. The method of claim 1, wherein the household information includes a telephone number associated with the household.

4. The method of claim 1, wherein the information indicative of a result of the comparison indicates that the particular telephone caller is authenticated.

5. The method of claim 4, wherein the information indicative of the result of the comparison includes additional household information.

6. The method of claim 5, wherein the additional household information includes household demographic information.

7. The method of claim 1, wherein the information indicative of a result of the comparison includes information that the comparison was inconclusive.

8. A caller authentication device, comprising:
    a processor;
    a network adaptor; and
    storage, including processor executable instructions that, when executed by the processor, cause the processor to perform operations comprising:
        monitoring a plurality of telephone calls associated with customer premises equipment of a household for a predetermined duration;
        for each of the plurality of telephone calls:
            responsive to determining that a voice pattern of a call participant matches a previously recorded pattern, determining whether a number of occurrences of the previously recorded pattern exceeds a sufficiency threshold; and
            responsive to determining the number of occurrences exceeds the sufficiency threshold, associating the voice pattern with the household;
        receiving, from an authentication requestor, a request to authenticate a telephone caller, the request including:
            a first voice pattern of the telephone caller; and
            household information indicative of the household;
        retrieving, based on at least some of the household information, a second voice pattern associated with a household member;
        comparing the first voice pattern to the second voice pattern;
        transmitting information indicative of a result of the comparing; and
        disassociating voice patterns associated with the household upon the occurrence of a change of household.

9. The device of claim 8, wherein the operations include:
    assigning the first voice pattern to at least one of a physical address for the household and a telephone number for the household.

10. The device of claim 8, wherein the household information includes at least one of a physical address for the household and a telephone number for the household.

11. The device of claim 8, wherein the information indicative of a result of the comparison includes a notice that the telephone caller is authenticated.

12. The device of claim 11, wherein the information indicative of a result of the comparison includes additional household information.

13. The device of claim 8, wherein the information indicative of a result of the comparison indicates that the telephone caller is not authenticated when a degree of matching between each of the first voice patterns and the second voice pattern is below a specified threshold.

14. The device of claim 8, wherein the information indicative of a result of the comparison indicates that the comparison was inconclusive.

15. A non-transitory computer readable storage device including computer executable instructions for authenticating a telephone caller alleging to be associated with a household, the instructions, when executed by a computer, causing the computer to perform operations comprising:
  monitoring a plurality of telephone calls associated with customer premises equipment of a household for a predetermined duration;
  for each of the plurality of telephone calls:
    responsive to determining that a voice pattern of a call participant matches a previously recorded pattern, determining whether a number of occurrences of the previously recorded pattern exceeds a sufficiency threshold; and
    responsive to determining the number of occurrences exceeds the sufficiency threshold, associating the voice pattern with the household;
  receiving, from an authentication requestor, a request to authenticate a telephone caller, the request including:
    a first voice pattern of the telephone caller; and
    household information indicative of the household;
  retrieving, based on at least some of the household information, a second voice pattern associated with a household member;
  comparing the first voice pattern to the second voice pattern;
  transmitting information indicative of a result of the comparing; and
  disassociating voice patterns associated with the household upon the occurrence of a change of household.

16. The computer readable storage device of claim 15 wherein the information indicative of the household includes at least one of a physical address for the household and a telephone number for the household.

17. The computer readable storage device of claim 15, wherein the information indicative of the result includes a notice that the telephone caller is authenticated.

18. The computer readable storage device of claim 17, wherein the information indicative of the result includes additional household information.

19. The computer readable storage device of claim 15, wherein the information indicative of the result a notice that the telephone caller is not authenticated.

20. The computer readable storage device of claim 15, wherein the information indicative of the result includes a notice that the comparison was inconclusive.

* * * * *